(12) United States Patent
La Ferla et al.

(10) Patent No.: US 6,648,584 B1
(45) Date of Patent: Nov. 18, 2003

(54) HEAT EXCHANGER BUNDLE EXTRACTOR (75) Inventors: Danilo La Ferla, Catania (IT); Franceso Viglianti, S. Agata Li Battiati (IT)

(73) Assignee: Good Rock S.p.A. (IT)

( * ) Notice: Subject to any disclaimer, the term of this patent is extended or adjusted under 35 U.S.C. 154(b) by 0 days.

(21) Appl. No.: 10/070,668

(22) PCT Filed: Mar. 3, 2000

(86) PCT No.: PCT/IT00/00069

§ 371 (c)(1),
(2), (4) Date: Mar. 29, 2002

(87) PCT Pub. No.: WO01/19563

PCT Pub. Date: Mar. 22, 2001

(30) Foreign Application Priority Data

| Sep. 10, 1999 | (IT) | .................................... RM990185 U |
| Oct. 1, 1999 | (IT) | .................................... RM990202 U |
| Nov. 3, 1999 | (IT) | .................................... RM990224 U |

(51) Int. Cl.[7] .................................................. B66F 9/04
(52) U.S. Cl. ..................... 414/745.3; 414/543; 414/544
(58) Field of Search ................... 414/542, 543, 414/544, 620, 495, 458, 744.3, 744.4, 744.6, 744.7, 745.3; 214/1; 212/195; 901/16, 17, 22, 24

(56) References Cited

U.S. PATENT DOCUMENTS

| 3,665,148 A | * | 5/1972 | Yasenchak et al. ...... 219/124.4 |
| 3,760,956 A | * | 9/1973 | Burch ...................... 414/744.3 |
| 4,132,318 A | * | 1/1979 | Wang et al. ................. 414/591 |
| 4,229,136 A | * | 10/1980 | Panissidi ..................... 414/673 |
| 4,392,524 A | * | 7/1983 | Bauch .......................... 165/76 |
| 4,575,305 A | * | 3/1986 | Krajicek et al. .......... 414/744.3 |
| 4,652,204 A | * | 3/1987 | Arnett ...................... 414/751.1 |
| 4,666,365 A | | 5/1987 | Cradeur |
| 5,322,410 A | | 6/1994 | Persinger et al. |
| 5,562,400 A | * | 10/1996 | Travis ..................... 414/745.3 |

FOREIGN PATENT DOCUMENTS

| EP | 0 053 757 A2 | 6/1982 |
| EP | 0 082 069 A1 | 6/1983 |
| EP | 0 589 792 A1 | 3/1994 |
| WO | 95/31308 A1 | 11/1995 |

* cited by examiner

Primary Examiner—Janice L. Krizek
Assistant Examiner—Michael J. Kwon
(74) Attorney, Agent, or Firm—Birch, Stewart, Kolasch & Birch, LLP (57) ABSTRACT

A heat exchanger bundle extractor apparatus (1), comprises: a supporting base (2, 29, 40), onto which a hoisting column (6) is rotatably mounted; a guide frame (7), mounted onto supports (8) on the hoisting column (6), and controlled hoisting and lowering means (9) for the moving of said supports (8) and said guide frame (7) along said hoisting column (6); a push/pull device (14) suitable for coupling to a respective front flange of a bundle, mounted on said guide frame (7); longidudinal translation means (15) apt to longitudinally moving said guide frame (7) with respect to said supports (8); and transversal translation means (19) mounted at said supports (8) and apt to transversally move said guide frame (7) with respect to said supports (8) and to the hoisting column (6).

20 Claims, 6 Drawing Sheets

HEAT EXCHANGER BUNDLE EXTRACTOR

CROSS REFERENCE TO RELATED APPLICATIONS

This application is the national phase under 35 U.S.C. § 371 of PCT International Application No. PCT/IT00/00069 which has an International filing date of Mar. 3, 2000, which designated the United States of America.

BACKGROUND OF THE INVENTION

The present invention relates to an apparatus for extracting and inserting a bundle assembly or the like from a heat exchanger shell.

It is known that in the industrial heat producing plants, heat exchanger shells comprising bulky and heavy bundles are provided. Such shells, due to their function, are subjected to periodical maintenance stops for attaining the faultless operation thereof. To date, various types of apparatus operating on sizeable constructions such as the industrial plant heat exchangers are known for this purpose. Such an apparatus should be capable of performing said maintenance stops, i.e., the extraction of the bundle from its shell, the transport of the former to the maintenance station and the reinsertion thereof inside the shell once the maintenance step is over, with no risk of injuring the inherently fragile bundle.

To this end, for said steps to be concomitantly and safely carried out a proper alignment between the apparatus enabling the extraction and the insertion of the bundle is required.

However, due to the weight of the apparatus and of the bundle itself, the apparatus must anyhow be blocked onto the ground, and this makes the alignment particularly cumbersome, often causing a repeated ground positioning and disengaging of the apparatus, each time involving the vehicle carrying the apparatus to realise even minor adjustments.

European Patent Application EP-A-0589792 discloses a device for the maintenance of a heat exchanger bundle assembly. The main disadvantage of such device is that it does not allow a fine positioning of its base in the field of operation. As a consequence, it is very difficult to perfectly align the apparatus with the bundle, in order to correctly extract the same from the heat exchanger.

The technical problem to be solved by the present invention is that of providing an apparatus allowing to overcome the drawbacks hereto mentioned with reference to the known art.

Such problem is overcome by a heat exchanger bundle extractor apparatus, comprises:

- a supporting base, onto which a hoisting column is rotatably mounted, said supporting base comprising means for rotating said hoisting column on its own vertical axis;
- a guide frame, mounted onto supports on the hoisting column, and controlled hoisting and lowering means for the moving of said supports and said guide frame along said hoisting column;
- a push/pull device suitable for coupling to a respective front flange of a bundle, mounted on said guide frame;
- longitudinal translation means apt to longitudinally moving said guide frame with respect to said supports, said guide frame being provided with bearing supports for said bundle; and
- transversal translation means mounted at said supports and apt to transversally move said guide frame with respect to said supports and to the hoisting column, wherein said supporting base comprises a multiplicity of hydraulic jacks mounted onto telescopic supports horizontally movable with respect to the plane of said base, characterised in that it at least a part of said multiplicity of hydraulic jacks comprises powered wheels for the moving of said base.

The main advantage of the apparatus according to the present invention, lies in allowing easier aligning steps between the devices thereof and the bundle, thereby avoiding time-consuming and cumbersome manoeuvres and implementing the utmost effectiveness thereof.

BRIEF DESCRIPTION OF THE DRAWINGS

The present invention will be hereinafter disclosed according to its preferred embodiments, given by way of example and not for limitative purposes, with reference to the annexed drawings, wherein.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
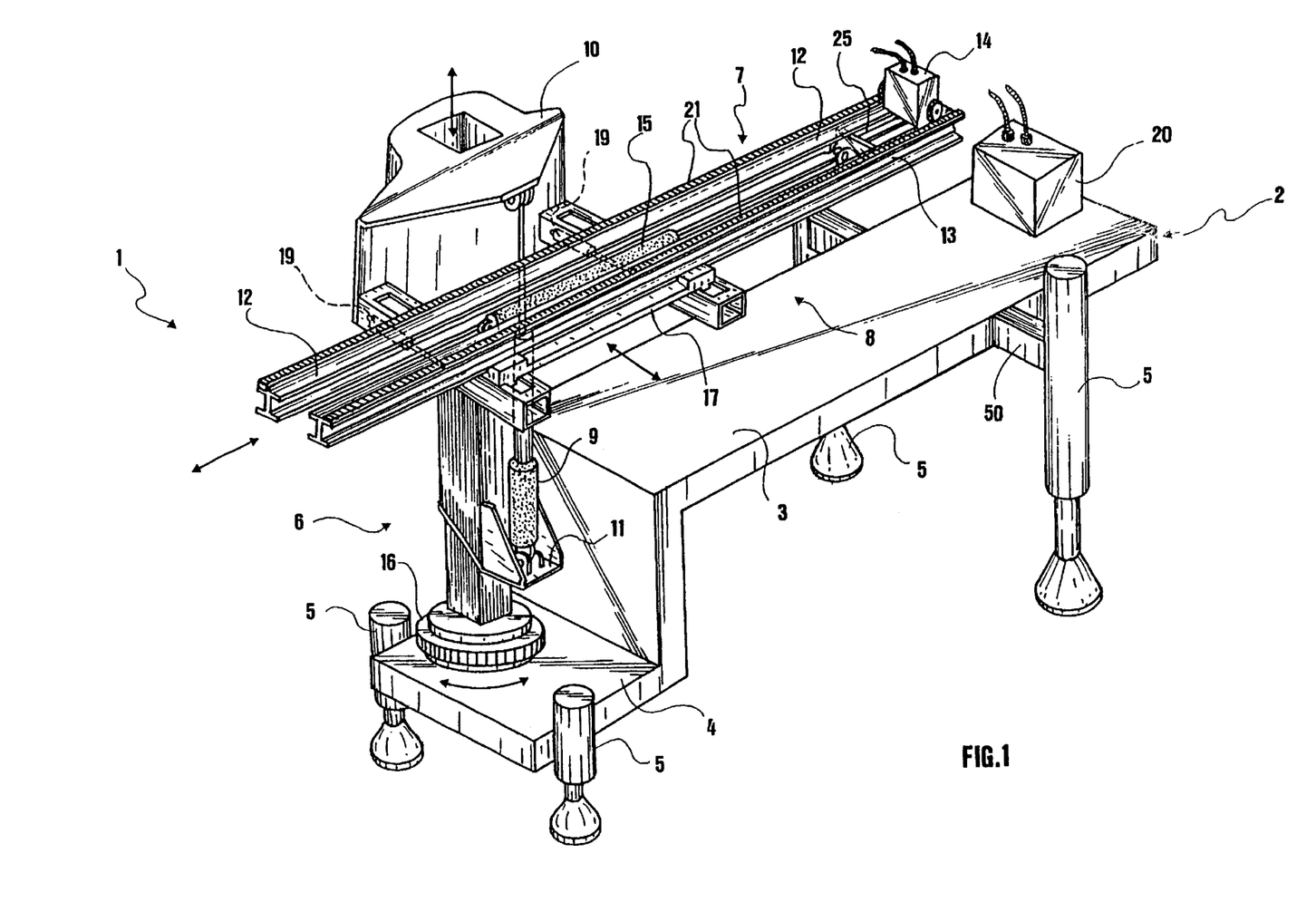
FIG. 1 is a partially sectional perspective view of a first embodiment of the apparatus according to the present invention.
Figure 2:
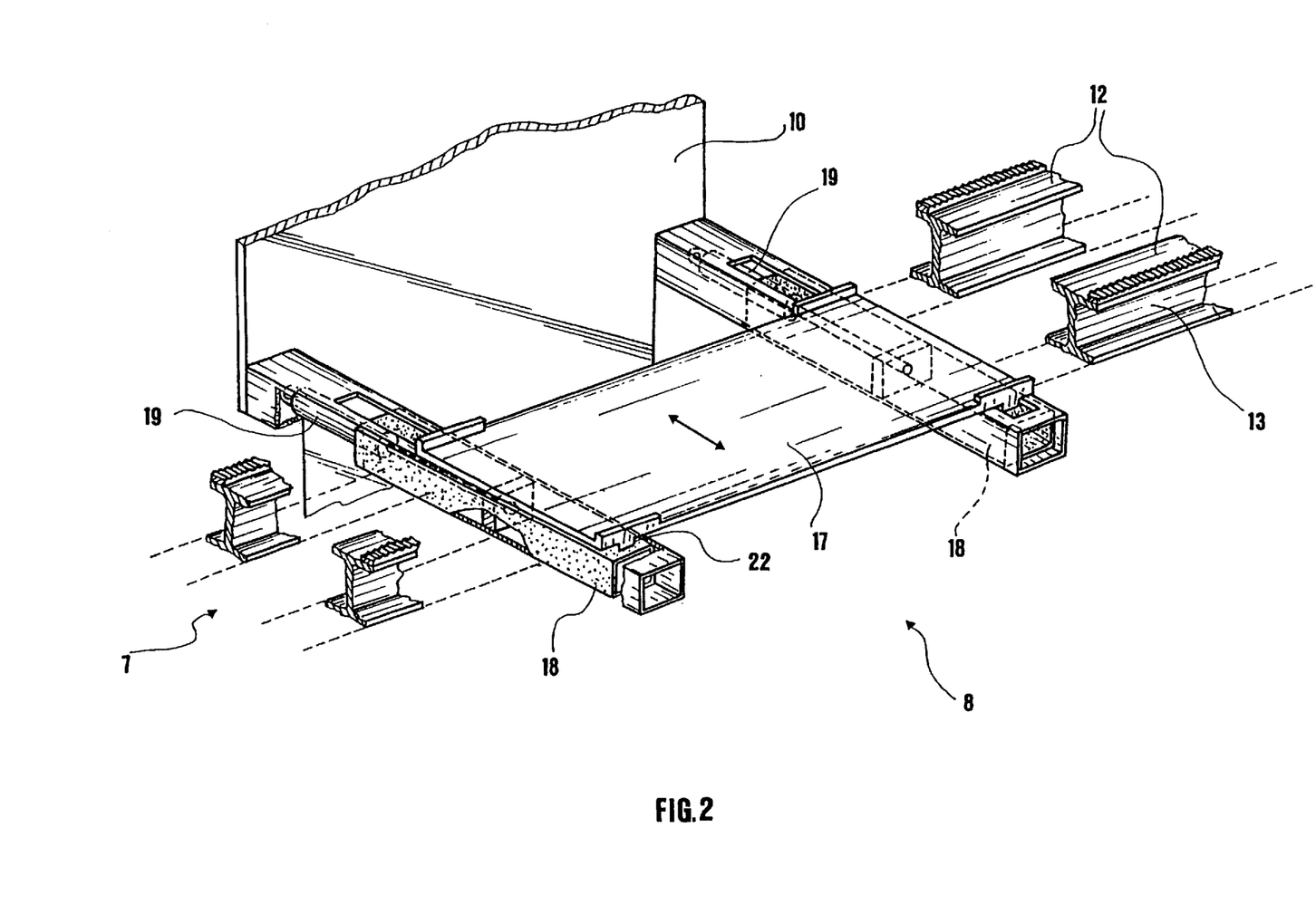
FIG. 2 is a partially sectional perspective view of a detail of the apparatus of FIG. 1.

Referring now to FIGS. 1 and 2, a first embodiment of the apparatus for the extraction and insertion or the hoisting of bundles according to the present invention is shown.

The apparatus, generally indicated with 1, comprises a supporting base made of a staggered structure 2, comprising an upper flatcar 3 and a lower flatcar 4.

The structure 2 is provided with ground engaging means that in the present embodiment of the invention are hydraulic jacks 5, mounted onto telescopic supports 50, horizontally extensible and located at the corners of the structure 2, apt to hoist off the ground the structure 2 once the same has been positioned by a trailer-mounted vehicle or other analogous means or system, conventional and not shown.

Thus, the jacks 5 operate as ground engaging members and as legs of the structure 2.

Onto the upper flatcar 3 of the structure 2 a conventional control unit 20 housing the controls and the drives of the apparatus 1 is located.

Such control unit 20 provides a power unit comprising: a battery, a muffled diesel engine, a hydraulic pressure pump, a plurality of oil supply valves, a Peltier effect electrical oil cooler member, an oil tank and a fuel tank. Moreover, the diesel engine is of the steady power kind.

A hoisting column 6, centrally and asymmetrically mounted with respect to the longitudinal axis of the apparatus 1, is rotatably coupled onto the lower flatcar 4 of the structure 2.

Said structure 2 comprises means for rotating said hoisting column 6 about its own vertical axis, partially shown as a crown wheel 16 at the base of the column 6, onto which a control engine, not shown, operates.

The hoisting column 6 is at least partially rotatable, e.g. of 100°.

The apparatus 1 comprises a guide frame 7, coupled to the hoisting column 5 by suitable supports 8.

The apparatus 1 further comprises controlled hoisting and lowering means, suitable for moving said supports 8 and said guide frame 7 along the hoisting column 6. Said controlled hoisting and lowering means realise a vertical hoisting and lowering shifting by means of two hydraulic members:

the first member is mounted in the inner hollow of the telescopic column 6 (not shown in figure); and the second member, indicated with 9, is suitable for sliding the member 10 outwards the upper telescopic member of the column 6, being connected thereto by means of a base member 11 of the column 6.

The apparatus 1 further comprises drives and controls for said telescopic assembly, of a conventional type and here not shown The guide frame 7 comprises a pair of side members 12 made of beams "H" cross sectional shaped, and parallel located at a predetermined distance, the sides thereof forming a race 13 for a push/pull device 14 mounted onto the guide frame 7, and suitable for coupling to a front flange of the bundle.

The device 14 being movable along the longitudinal direction and onto the guide frame 7, comprises a slide and an hydraulic engine coupled to a reduction gear meshing a pair of racks 21. Advantageously, the hydraulic engine of the device 14 can be of the steady power and variable torque type, so as to adjust the pulling force of the device according to the bundle drag value.

For this purpose, the guide frame 7 is provided of sliding surfaces 25 for slidingly bearing said bundle when the latter is dragged by the push/pull device 14 onto the beams 12.

The apparatus 1 further comprises longitudinal displacement means in order to longitudinally move the guide frame 7 with respect to the supports 8.

The longitudinal traverse means comprise a hydraulic ram 15 fixed to said supports 8 and acting onto the guide frame 7. The latter is slidably mounted on a guide 17 which is beared on the supports 8.

The supports 8 are arranged in a fork-shape manner, with at least two claws 18 made of box-shaped bodies. The guide 17 is a plate apt to distribute the bundle weight onto the supports 8, i.e. onto the claws 18.

The apparatus 1 further comprises transversal displacement means provided at said supports 8 and apt to shift the guide frame 7 with respect to the supports 8 and to the hoisting column 6.

The transversal displacement means comprises a pair of second hydraulic rams 19, housed inside the box shaped bodies of the claws 18.

The second hydraulic rams 19 are coupled to the guide 17 which is mounted onto runners 22 which are slidable onto the claws 18 of the supports 8.

Thus, said rams 19 indirectly act onto the guide frame 7, that can be shifted outwardly or inwardly with respect to the hoisting column 6, varying the distance of the side members 12 therefrom.

The runners 22 comprise sliding surfaces made of a low friction material, preferably a technopolymer like polytetrafluoroethylene.

Concerning the function of the apparatus 1, at first it is positioned near the extraction area, e.g. near a heat exchanger whose shell has been opened in order to allow the bundle extraction.

Once the structure 2 has been ground blocked, the guide frame 7 is suitably positioned, rotating the hoisting column 6 and hoisting the guide frame 7 at the height corresponding to the coupling flange of the bundle.

Then the push/pull device 14 is neared to the flange by longitudinally shifting the guide frame 7.

The proper alignment of the device 14, i.e. of the race 13 thereof onto the side members 12 with respect to the bundle, should be ascertained prior to connecting the device 14 to the flange. This step can be carried out without moving the staggered structure 2, merely by shifting in the transversal direction the guide frame 7 with respect to the supports and to the column 6.

Once the flange is coupled, the pulling device 14 drags the bundle slidingly supporting the same by means of the side members 12.

When the bundle is completely extracted, a balancing of the weight thereof can be attained by longitudinally and transversely moving the guide frame 7, then the bundle can be lowered and transported where needed.

It has to be pointed out that the introduction step is analogous to the extraction step.

Figure 3:
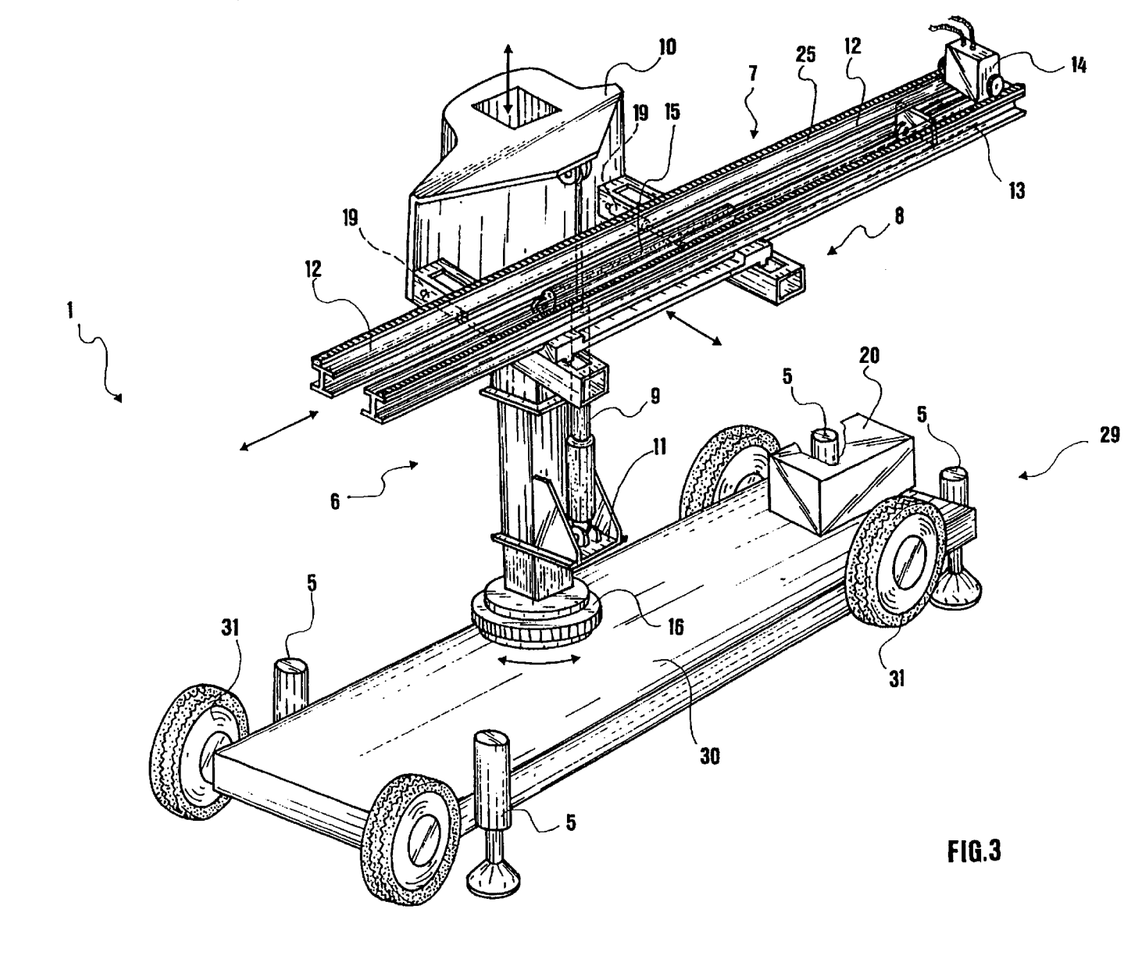
FIG. 3 is a partially sectional perspective view of a second embodiment of the apparatus according to the present invention.
Figures 4, 5:
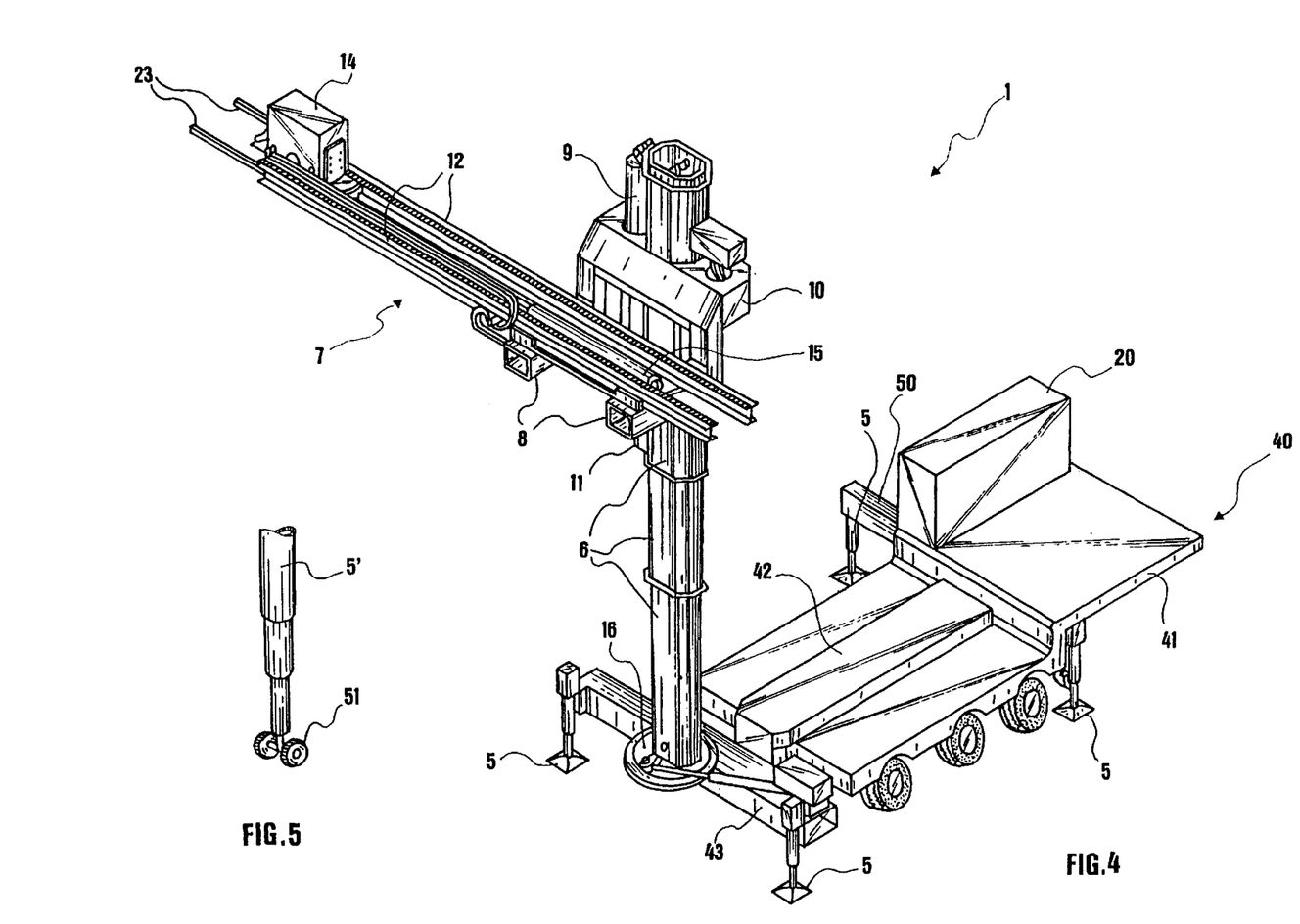
FIG. 4 is a perspective view of a third embodiment of the apparatus of the present invention, in an operative condition.
FIG. 5 shows a detail relating to an hydraulic jack.
Figures 6, 7:
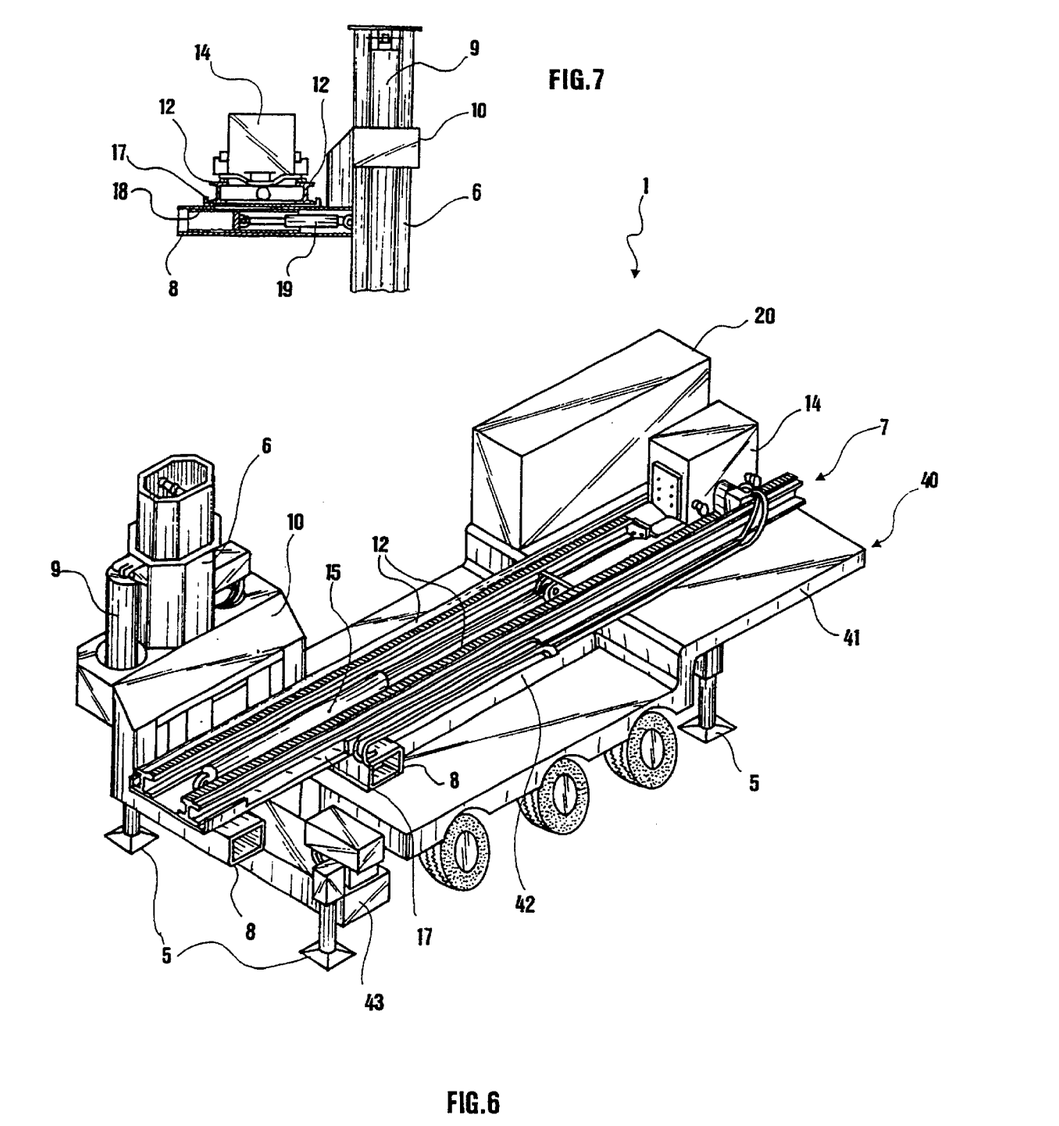
FIG. 6 is a perspective view of the apparatus of FIG. 4 in a second non-operative condition thereof.
FIG. 7 shows in a partial sectional view a detail of the apparatus of FIG. 4.
Figure 8:
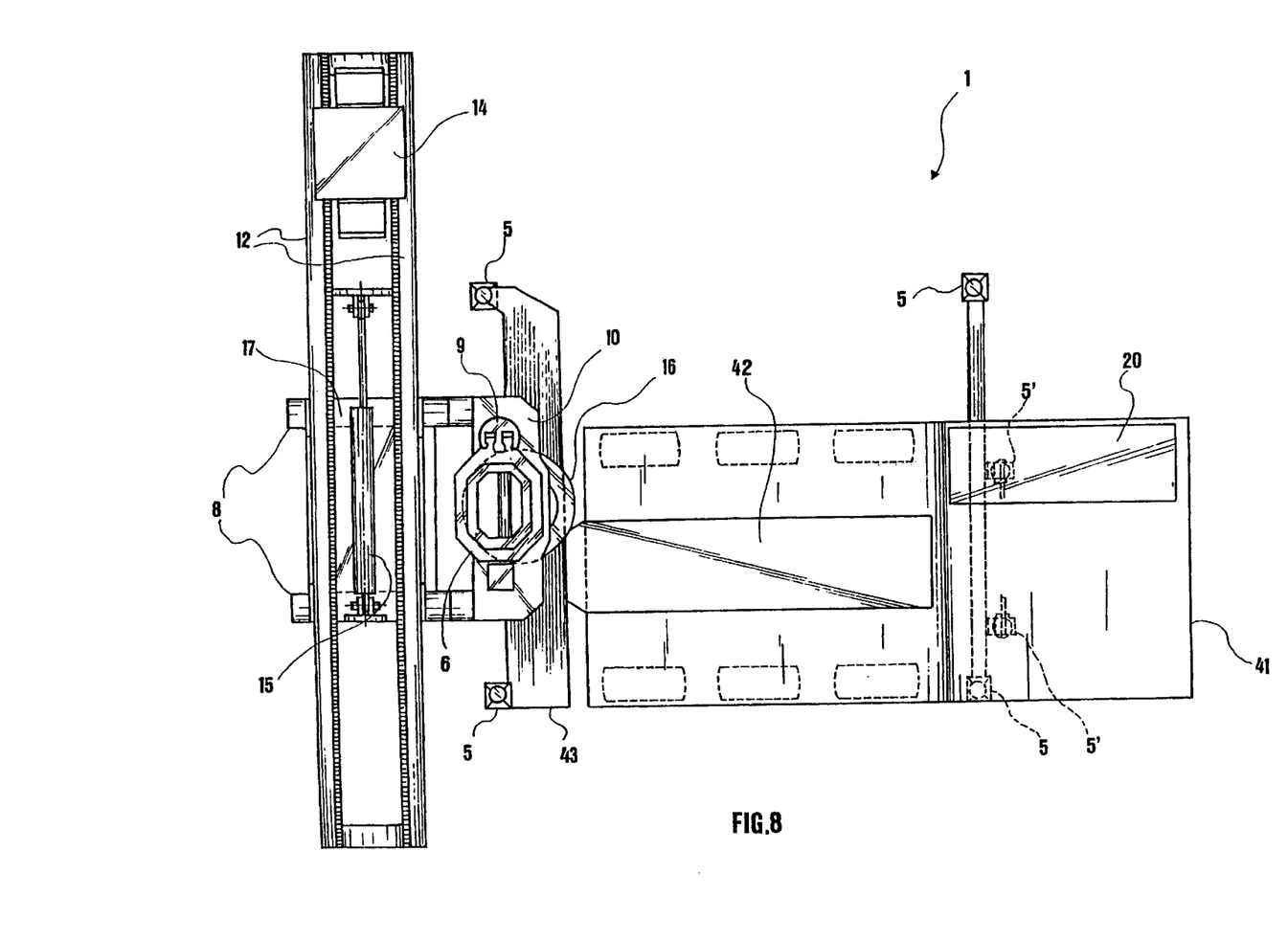
FIG. 8 is a plan view of the apparatus of FIG. 4.

Referring now to FIG. 3, a second embodiment of the apparatus according to the present invention is shown. Hereinafter, for the sake of simplicity same members hereto described with reference to the preceding figures will have same reference numbers.

According to this instance, the apparatus generally indicated with the reference number 1 comprises a self-propelled vehicle 29 made of a platform 30 having wheels 31.

The platform 30 is provided with ground engaging means, i.e. hydraulic jacks 5 in the present embodiment of the invention, at each wheel 31. Said jacks are apt to hoist the platform 30 off the ground until the wheels 31 lose contact, therefore operating as ground engaging members and as legs for the platform 30.

As for the first embodiment, this second embodiment has a hoisting column 6 rotatably mounted onto the platform 30 and suitable for supporting a multiplicity of devices for moving the bundle thereon and Such devices will not be hereinafter described in detail, as the description thereof has already been given.

The self-propelled vehicle 29 can advantageously be used to arrange the apparatus 1 near to the extraction area, e.g. near a heat exchanger whose shell has been opened in order to allow the extraction of its bundle.

Once the vehicle 29 is blocked onto the ground by means of the hydraulic jacks 5, the aligning step of the apparatus 1 to the flange of the heat exchanger can be carried out as already disclosed with reference to the first embodiment, without moving the self-propelled vehicle 29 but merely by shifting in a transversal direction the guide frame 7 with respect to the supports 8 and to the column 6.

Once the bundle is completely extracted and laid onto the platform 30, the self-propelled vehicle 29 can be moved to where needed without the intervention of other means. Eventually, a possible bundle introduction step can be carried out in a analogous manner as to the extraction step hereto disclosed.

Referring now to FIGS. 4 to 8, a third embodiment of the apparatus according to the present invention is shown.

In this case, the apparatus is generally indicated with the reference number 1, and comprises a trailer 40 supporting a staggered metal frame, provided with ground engaging means, e.g. hydraulic jacks 5 mounted onto horizontally extensible telescopic supports 50 in order to increase the stability of the machine during the operation thereof.

Moreover, the trailer 40 is further provided with two hydraulic jacks 5' at the front center portion of the trailer 40, apt to intervene when the tractor is uncoupled. Said jacks 5' rest on the ground by means of small-diameter rubber wheels 51, hydraulically driven and capable of allowing small displacement of the trailer 40 even in absence of a tractor.

A conventional control unit 20 housing the controls and the drivers of the apparatus 1 is mounted at the upper flatcar 41 of the trailer 40.

The lower flatcar 42 of the trailer 40 comprises a frame 43, a hoisting column 6 for the supporting of suitable devices for extracting and/or inserting the bundles and being rotatably mounted thereon. The detailed description of said devices will not here be given, as already described with reference to the preceding embodiments.

The hoisting column 6 is of a telescopic type, with at least three coaxial members. The vertical displacement is provided by a telescopic hydraulic piston (not shown), inserted into the column hollow.

The apparatus 1 comprises a guide frame 7, applied onto the hoisting column 6 with suitable supports 8.

The guide frame 7 comprises a pair of members 12, made of H-beams arranged at a certain distance and parallel to each other, the sides thereof forming a race 13 for a push/pull device 14 applied to the guide frame 7, the device 14 being apt to be coupled to a front flange of the bundle.

The device 14 can be moved onto the guide frame 7 along the longitudinal direction, and it comprises a slide and a hydraulic motor with a reduction gear meshing racks 21.

As for the preceding embodiments, the apparatus 1 further comprises means for the longitudinal and transversal motion of the guide frame 7 with respect to the supports 8.

Moreover, two extensible bars 23 are mounted at the ends of the beams 12 such that when abut against the flange of the shell of the heat exchanger from which the bundle is to be extracted, the bars allow to reduce the bending moment onto the column 6 at the initial extraction stage, when entailing the heaviest structural stress.

A first approach of the apparatus 1 to the extraction area can be directly carried out using the tractor of the trailer 40.

Once the trailer 40 has been positioned near the extraction area, the tractor can be disengaged from the trailer allowing the former to be destined to other uses, whereas the latter can be supported by the hydraulic jacks 5' which as already disclosed the same allow small displacements of the trailer itself. After the trailer 40 has been blocked on the ground by means of the jacks 5, the aligning step of the apparatus 1 with the bundle to be extracted can be carried out without further displacements of the trailer 40, but merely by shifting the guide frame 7 transversally with respect to the supports 8 and to the column 6.

Once the flange is connected, the push/pull device 14 drags the bundle while being slidingly supported by the members 12.

When the bundle is totally extracted, the balancing of the weight thereof can be performed by shifting the guide frame 7 in the longitudinal and transversal directions, then the bundle can be lowered and positioned onto the trailer 40, where the latter can advantageously be engaged to the tractor and transported where required.

To the abovedescribed apparatus for introducing, extracting, and in general for moving bundles and the like, a person skilled in the art may effect several further modifications and variants, all however comprised within the scope of the present invention, as defined by the annexed claims.

What is claimed is:

1. A heat exchanger bundle extractor apparatus (1), comprises:

a supporting base (2,29,40), onto which a hoisting column (6) is rotatably mounted, said supporting base comprising means (16) for rotating said hoisting column (6) on its own vertical axis;

a guide frame (7), mounted onto supports (8) on the hoisting column (6), and controlled hoisting and lowering means (9) for the moving of said supports (8) and said guide frame (7) along said hoisting column (6);

a push/pull device (14) suitable for coupling to a respective front flange of a bundle, mounted on said guide frame (7);

longitudinal translation means (15) apt to longitudinally moving said guide frame (7) with respect to said supports (8), said guide frame (7) being provided with sliding supporting surfaces (25) for said bundle; and transversal translation means (19) mounted at said supports (8) and apt to transversally move said guide frame (7) with respect to said supports (8) and to the hoisting column (6), wherein said supporting base (2,29,40) comprises a multiplicity of hydraulic jacks (5, 5') mounted onto telescopic supports (50) horizontally movable with respect to the plane of said base (2,29,40), and wherein at least a part of said multiplicity of hydraulic jacks (5') comprises powered wheels (51) for the moving of said base.

2. The apparatus (1) according to claim 1, wherein said supporting base is a staggered structure (2) comprising an upper flatcar (3) and a lower flatcar (4), said hoisting column (6) being rotatably mounted thereto.

3. The apparatus (1) according to claim 1, wherein said supporting base is a self-propelled vehicle (29) comprising a platform (30), said hoisting column (6) being rotatably mounted thereto.

4. The apparatus (1) according to claim 1, wherein said supporting base is a trailer (40) comprising a staggered metal structure, said hoisting column (6) being rotatably mounted thereto.

5. The apparatus (1) according to claim 1, wherein said push/pull device (14) comprises a steady power hydraulic engine having with variable displacement and variable torque.

6. The apparatus (1) according to claim 1, wherein said controlled hoisting and lowering means (9) are hydraulic.

7. The apparatus (1) according to claim 1, wherein said guide frame (7) comprises a pair of members (12) slidably mounted with respect to said supports (8).

8. The apparatus (1) according to claim 1, wherein said longitudinal translation means comprises at least a first hydraulic piston (15), connected to said supports (8) and to said guide frame (7).

9. The apparatus (1) according to claim 1, wherein said supports (8) are arranged in a fork-shaped manner with at least two members (18) made of box-shaped bodies, inside which respective said second hydraulic pistons (19) are housed.

10. The apparatus (1) according to claim 1, wherein at the ends of each one of the pair of side members (12) extensible bars (23) are respectively mounted thereto for the abutting onto a flange of the shell of the heat exchanger from which the bundle is to be extracted.

11. The apparatus (1) according to claim 1, wherein said guide frame (7) is slidably mounted on a moveable guide (17) positioned on said supports (8) and moveable with respect to said supports (8).

12. The apparatus (1) according to claim 11, wherein said guide (17) is plate shaped for distributing the bundle weight onto the supports (18).

13. The apparatus (1) according to claim 1, wherein a power unit (20) is mounted onto said supporting base (2,29,40).

14. The apparatus (1) according to claim 13, wherein said power unit (20) comprises: a battery, a muffled diesel engine, a hydraulic pressure pump, a plurality of oil supply valve, an oil cooling electrical member, an oil tank and a fuel tank.

15. The apparatus (1) according to claim 14, wherein the diesel engine is a steady power controlled engine.

16. The apparatus (1) according to claim 1, wherein said transversal translation means comprises at least one second hydraulic piston (19).

17. The apparatus (1) according to claim 16, wherein said at least a second hydraulic piston (19) is connected to said movable guide (17), the latter being mounted onto runners (22) which are apt to slide onto said supports (8).

18. The apparatus (1) according to claim 17, wherein said runners (22) comprise slide surfaces made of a low friction material.

19. The apparatus according to claim 18, wherein said low friction material is a technopolymer.

20. The apparatus according to claim 19, wherein said technopolymer is polytetrafluoroethylene.

* * * * *